United States Patent
Sun et al.

(10) Patent No.: US 9,990,490 B2
(45) Date of Patent: *Jun. 5, 2018

(54) GENERIC PRIVILEGE ESCALATION PREVENTION

(71) Applicant: McAfee, LLC, Plano, TX (US)

(72) Inventors: Bing Sun, Sunnyvale, CA (US); Chong Xu, Sunnyvale, CA (US); Jeff Hetzler, Manning, OR (US); Zheng Bu, Fremont, CA (US)

(73) Assignee: McAfee, LLC, Plano, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 14/941,228

(22) Filed: Nov. 13, 2015

(65) Prior Publication Data
US 2016/0070906 A1    Mar. 10, 2016

Related U.S. Application Data

(63) Continuation of application No. 13/977,014, filed as application No. PCT/US2013/032426 on Mar. 15, 2013, now Pat. No. 9,197,660.

(51) Int. Cl.
*G06F 21/52*    (2013.01)
*G06F 21/74*    (2013.01)
*H04L 29/06*    (2006.01)

(52) U.S. Cl.
CPC ............ *G06F 21/52* (2013.01); *G06F 21/74* (2013.01); *H04L 63/1441* (2013.01); *G06F 2221/033* (2013.01); *G06F 2221/2141* (2013.01)

(58) Field of Classification Search
CPC .......... G06F 21/50; G06F 21/52; G06F 21/56; G06F 21/566
See application file for complete search history.

(56) References Cited

U.S. PATENT DOCUMENTS

| | | |
|---|---|---|
| 5,987,610 A | 11/1999 | Franczek et al. |
| 6,073,142 A | 6/2000 | Geiger et al. |
| 6,279,111 B1 | 8/2001 | Jensenworth et al. |
| 6,460,050 B1 | 10/2002 | Pace et al. |
| 7,506,155 B1 | 3/2009 | Stewart et al. |
| 7,665,139 B1 * | 2/2010 | Szor ............... G06F 21/554 713/100 |
| 8,266,702 B2 | 9/2012 | Naldurg et al. |

(Continued)

FOREIGN PATENT DOCUMENTS

| | | |
|---|---|---|
| WO | WO 2009/131371 | * 10/2009 |
| WO | WO 2013/025581 | 2/2013 |
| WO | WO 2014/143029 | 9/2014 |

OTHER PUBLICATIONS

PCT International Search Report and Written Opinion received for PCT Patent Application No. PCT/US2013/032426, dated Dec. 18, 2013, 12 Pages.

PCT International Preliminary Report on Patentability in PCT International Application Serial No. PCT/US2013/032426 dated Sep. 15, 2015.

(Continued)

*Primary Examiner* — Khang Do

(74) *Attorney, Agent, or Firm* — Patent Capital Group

(57) ABSTRACT

An apparatus, method, computer readable storage medium are provided in one or more examples and comprise accessing an application, identifying an access token of the application, determining if the access token is a system token, and responsive to the access token failing to be a system token, enabling a runtime module.

20 Claims, 5 Drawing Sheets

(56) References Cited

U.S. PATENT DOCUMENTS

| | | | |
|---|---|---|---|
| 8,499,354 B1* | 7/2013 | Satish | G06F 9/44521 726/22 |
| 9,092,625 B1* | 7/2015 | Kashyap | G06F 21/566 |
| 2003/0140253 A1* | 7/2003 | Crosbie | G06F 21/554 726/28 |
| 2007/0083912 A1* | 4/2007 | Lambert | G06F 21/6218 726/3 |
| 2007/0101405 A1 | 5/2007 | Engle et al. | |
| 2009/0271863 A1* | 10/2009 | Govindavajhala | G06F 21/577 726/23 |
| 2009/0276853 A1 | 11/2009 | Govindavajhala et al. | |
| 2009/0328180 A1 | 12/2009 | Coles et al. | |
| 2010/0005291 A1* | 1/2010 | Hulten | G06F 21/51 713/156 |
| 2010/0132053 A1* | 5/2010 | Chishima | G06F 21/74 726/30 |
| 2010/0306851 A1* | 12/2010 | Zhou | G06F 21/554 726/25 |
| 2012/0198557 A1 | 8/2012 | Pistoia et al. | |
| 2013/0067583 A1 | 3/2013 | Naldurg et al. | |
| 2013/0232540 A1* | 9/2013 | Saidi | G06F 21/6218 726/1 |
| 2014/0351930 A1 | 11/2014 | Sun et al. | |

OTHER PUBLICATIONS

"Access Tokens (Windows)", Microsoft Corporation, available online at https://web.archive.org/web/20130128101220/http://msdn.microsoft.com/zh-cn/library/windows/desktop/aa374909(v=vs.85).aspx, (Oct. 26, 2012).

* cited by examiner

GENERIC PRIVILEGE ESCALATION PREVENTION

CROSS-REFERENCE TO RELATED APPLICATIONS

This application is a continuation (and claims the benefit under 35 U.S.C. § 120) of U.S. patent application Ser. No. 13/977,014, filed Jun. 28, 2013, entitled "Generic Privilege Escalation Prevention," which is a National Stage filing under 35 U.S.C. § 371 of International Application Serial No. PCT/US2013/03246, filed Mar. 15, 2013, entitled "Generic Privilege Escalation Prevention." The disclosures of the previously filed applications are considered part of (and are incorporated by reference in) the disclosure of this application.

TECHNICAL FIELD

This disclosure relates in general to the field of computer systems, and more particularly, to preventing privilege escalation in a computer environment.

BACKGROUND

The field of network security has become increasingly important in today's society. The Internet has enabled interconnection of different computer networks all over the world. However, the Internet has also presented many opportunities for malicious operators to exploit these networks. Once malicious software (also referred to herein as 'malware') has infected a host computer, a malicious operator may issue commands from a remote computer to control the malicious software. In other scenarios, the software may be inherently configured to perform certain actions without necessarily responding to an operator's commands. Malicious software can be configured to perform any number of malicious actions, such as sending out spam or malicious emails from the host computer, stealing sensitive information from a business or individual associated with the host computer, propagating to other host computers, and/or assisting with distributed denial of service attacks. In other scenarios, malicious software can be configured to target certain regions of a storage disk in order to gain unauthorized control of the host computer and its resources. Thus, the ability to effectively protect and maintain stable computers and systems continues to present significant challenges for component manufacturers, system designers, and network operators.

A privilege escalation (PE) attack refers to a type of computer-based attack in which an attacker attempts to exploit inadequate or nonexistent controls to gain access to resources of a computer software application that are intended for access only by valid users having privileged rights, or that are intended for access by valid users having even non-privileged rights but that are meant to be off-limits to the attacker. It would be advantageous to check computer software applications during their development to determine whether they are vulnerable to PE attacks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EMBODIMENTS

Embodiments

Figure 1:
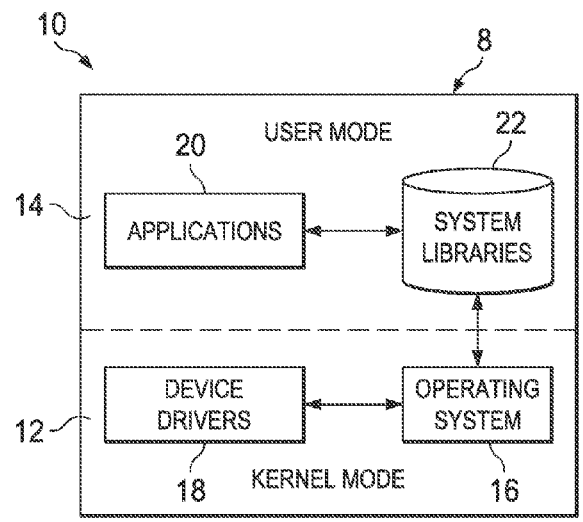
FIG. 1 is a simplified block diagram that depicts an example of a computer system in accordance with an embodiment.

FIG. 1 is a block diagram that depicts an example of a computer system 10 in accordance with an embodiment. Computer operating systems provide different levels of access to resources. A memory 8 in computer system 10 may include two or more hierarchical levels or layers of privilege within the architecture of a computer system. This is generally hardware-enforced by some central processing unit (CPU) architectures that provide different CPU modes at the hardware or microcode level. The levels, kernel mode 12 and user mode 14 are arranged in a hierarchy from most privileged (most trusted), kernel mode 12, to least privileged (least trusted), user mode 14. Operating system 16 and device drivers 18 may operate in kernel mode 12. Likewise, applications 20 and system libraries 22 may operate in user mode 14.

On most operating systems, kernel mode 12 is the level with the most privileges, and interacts most directly with the physical hardware such as the CPU and memory. Special gates between kernel mode 12 and user mode 14 are provided to allow a user mode 14 to access resources of kernel mode 12 in a predefined manner, as opposed to allowing arbitrary usage. Correctly gating access between kernel mode 12 and user mode 14 can improve security by preventing programs from the privilege level from misusing resources intended for programs in another. For example, spyware running as a user program in applications 20 in user mode 14 should be prevented from turning on a web camera without informing the user, since hardware access may be a function reserved for device drivers 18, which may be in kernel mode 12. Programs such as web browsers running in user mode 14 should request access to the network, a resource restricted to kernel mode 12. In one or more embodiments, there may be more than two levels of privilege. Other embodiments may have as much as four or more levels.

For purposes of illustrating certain example techniques of computer system 10, it is important to understand the communications that may be traversing the computer environment. The following foundational information may be viewed as a basis from which the present disclosure may be properly explained.

Most computer systems are designed for use with multiple subjects. Privileges indicate what a subject (or user) is permitted to do. Common privileges include viewing and editing files, or modifying system files. Privilege escalation means subject 26 received privileges to which subject 26 is not entitled. These privileges can be used to delete files, view private information, or install unwanted programs such as viruses. Privilege escalation may occur when a system has a bug that allows security to be bypassed or, alternatively, has flawed design assumptions about how privilege escalation may be used.

Some security-related dependencies may not be directly visible. As an example, some operating systems may be configured to implicitly decide whether a subject is a member of an "Interactive Users" group when the subject logs in. Consequently, the subject's access control permissions may not be discernible until the subject logs in.

In some operating systems, the protection model is rigid and restricted to fully privileged kernel mode and a lesser-privileged user mode. Because this type of protection model cannot be easily changed, many applications run with far more privileges than a task may.

When the central processing unit is in kernel mode, the central processing unit may be assumed to be executing trusted software, and thus the central processing unit can execute any instructions and reference any memory addresses (i.e., locations in memory). The kernel (which is the core of the operating system and has complete control over everything that occurs in the system) is trusted software, but all other programs are considered untrusted software. Thus, all user mode software can request use of the kernel by means of a system call in order to perform privileged instructions, such as process creation or input/output operations.

Because of the enforcement of User Access Control of operating systems, the first stage exploitation may be in a lower privilege level. There may have been steady growth in kernel mode vulnerabilities in the past few years, and these vulnerabilities may be leveraged to achieve an escalation of privilege. One or more embodiments recognize a need to stop escalation of privilege (EoP) exploits.

Figure 2:
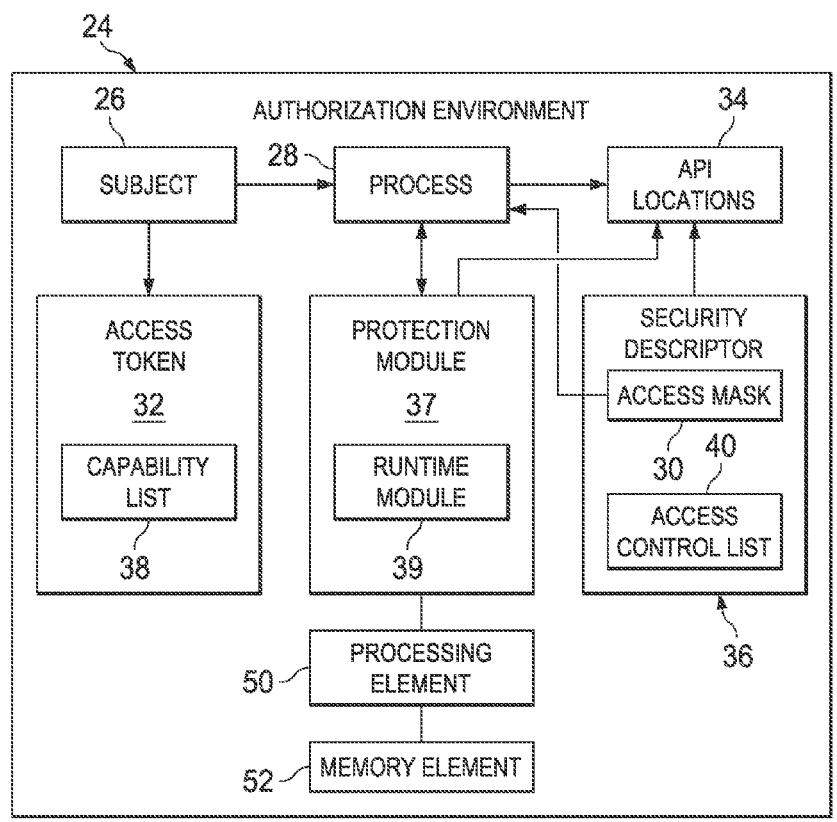
FIG. 2 is a simplified example of an authorization environment in accordance with an embodiment.

Turning to FIG. 2, FIG. 2 may be an example of an authorization environment 24 in accordance with an embodiment. Authorization environment 24 may include a subject 26, a process 28, an access mask 30, an access token 32, API locations 34, a security descriptor 36, and a protection module 37 with a runtime module 39. Furthermore, access token 32 may include a capability list 38 and security descriptor 36 may include an access control list (ACL) 40. Authorization environment 24 may be an environment where subjects 26 can access API locations 34.

In one or more embodiments, subject 26 may be a security principal, such as a user, computer, or application. Subject 26 may not accesses objects (a resource) directly. There may be a server process that acts on behalf of subject 26. This server process may be referred to as impersonation. When a server process impersonates subject 26, it means that it runs in the security context of subject 26 and that it uses the authorization attributes of subject 26. Additionally, subject 26 may be configured to start process 28.

Access token 32 may be configured to allow operating system 16 to associate authorization data (rights and group memberships) of subject 26 with every process 28 started by subject 26. Access token 32 may be linked to a logon session of subject 26. Process 28 may include multiple threads running multiple instructions to access API locations 34. Process 28 may be configured to access API locations 34. API locations 34 may be areas of an API where hooks may be placed.

Additionally, access token 32 may be a primary token. Primary tokens may have different levels of privilege. When a primary token has system level privileges, that token may be referred to as a system level token. When access token 32 is a system token it may be considered a higher privileged token. Access token 32 may describe a security context of process 28 or a thread in process 28. The information in access token 32 includes the identity and privileges of subject 26 associated with process 28. When subject 26 logs onto a system, authorization environment 24 may be configured to verify the password of subject 26 by comparing it with information stored in a security database. If the password is authenticated, authorization environment 24 may be configured to produce access token 32. Every process executed on behalf of subject 26 has a copy of access token 32.

Authorization environment 24 may use access token 32 to identify subject 26 when process 28 interacts with an object or attempts to perform a system task that requires privileges. Access token 32 may include the security identifier (SID), compatibility list 38, and other statistics. Compatibility list 38 may be a list of privileges held by subject 26.

When API locations 34 are hooked, the behavior of applications 20 may be altered by intercepting function calls passed between software components. The code that manages the intercepted function calls is referred to as a "hook". To "hook" API locations 34 means to monitor execution of the API such that, when a process calls the API, the protection module may execute just before the API executes. Protection module 37 may utilize "handler" code to handle the "hooking". To achieve this, protection module 37 may be configured to modify the first instruction(s) of the API. Placing a jump instruction (to jump to the handler) may achieve this. After the handler executes, the (relocated) first instructions(s) of the API are executed and then jumps back to the remaining instructions in the original API code. In other words, the API locations 34 may be specific functions called by an API call.

Each of API locations 34 may be a specific function within the API and accessed by an API call. For example, each API location may be, for example, but not limited to, Kernel32!CreateProcess, NtdII!NtQueryInformationToken, and other suitable API functions.

In an embodiment of this disclosure, API locations 34 may or may not be configured to access objects. Objects may include resources hosted on a client, file server, printer queues on a print server, active directory (AD) objects in the AD database on a domain controller (DC), or any other object that is kept in an operating system infrastructure. Objects may also be a plurality of objects and each object may be located at a different location.

The main authorization attribute on an object is called security descriptor 36. Security descriptor 36 may tell the authorization system what subject 26 can do what with the object. Every object that has a security descriptor linked to it is called a securable object. Securable objects can be shared between different subjects, and every subject can have different authorization settings. Examples of securable objects include a file, a folder, a file system share, a printer, a registry key, an AD object, and a service. Security descriptor 36 of objects may be stored in a file system. Security descriptor 36 of an AD object is stored in an attribute of the object.

Security descriptor 36 may contain Access Control List (ACL) 40. ACL 40 is composed of multiple Access Control Entries (ACEs)—an ACE is also referred to as a "permission." An ACE links a security identity (SID) to an access right (for example, read, write, delete, execute). In security descriptor 36, a hexadecimal value called access mask 30 may be used to represent an access right.

Operating system (OS) 16 may make access control decisions using configuration metadata, such as access token 32, security descriptor 36, capability list 38, and access control lists (ACLs) 40. The metadata is stored in different formats and can be manipulated in a variety of ways, directly influencing what is perceived as access control behavior. Existing interfaces that query and manipulate the metadata may be low-level and do not allow software developers the ability to specify information-flow goals and verify intent effectively. As an example, in operating system 16, there can be a complex interplay between different access control security mechanisms. As another example, access checks the operating system performs based on access token 32 and security descriptor 36 can be quite involved. Access token 32 may contain group membership information that is inherited from a parent object. Access token 32 could have attributes that may not readily indicate access privileges of subject 26 because these access privileges are inherited. Security descriptor 36 may identify security-related properties, such as access control permissions.

Subject 26 generally cannot directly specify simple information-flow policies, such as confidentiality, integrity, and privilege-escalation. As an example, a system administrator may desire to ensure various access control properties, such as integrity or confidentiality. When operating system 16 offers integrity, a lower-privileged process cannot modify data used by a higher-privileged process. When operating system 16 offers confidentiality, security-sensitive information is not accessible to lower-privileged processes. To enforce these conceptually simple access controls, users may need to correctly configure a variety of low-level access settings. This configuration can be complex and, if not correctly implemented, may not be correctly enforced.

One or more embodiments of this disclosure may assume that after successful EoP, the exploit may call API locations 34 to execute further attacks such as examining the current process's user privilege, loading a dynamic-link library (DLL), creating a new process, injecting to other processes, etc. Without the help of API locations 34, the exploit may not be able to do anything meaningful. One or more embodiments of this disclosure detects the exploit (shellcode) running after a successful EoP.

One or more embodiments of this disclosure may be generic to all kind of EoP attacks, and may also be especially effective against kernel-mode vulnerabilities because many EoP attacks are conducted via kernel vulnerabilities. Many kernel exploits may not perform all operations completely in kernel mode. Instead, the exploits may either escalate a user-mode normal process to system level or inject code to a user-mode system level process.

Protection module 37 may leverage a user-mode API monitoring framework. Protection module 37 may include runtime module 39. Runtime module 39 may be enabled or disabled by protection module 37. Runtime module may be enabled when an application accessing monitored API locations 34 does not include access token 32 that is a system token.

Runtime module 39, when enabled, may monitor API locations 34 in some normal (non-system/service) processes. API locations 34 and applications being protected can be specified by a configuration file or server side policy. API locations 34 chosen may be those critical APIs which are frequently used by the exploits, such as Kernel32!CreateProcess, NtdII!NtQueryInformationToken, etc. The applications being protected may be those high-risk remotely exploitable, normal applications (non-system/service process), such as a web browser, etc. These applications may be referred to as protected applications. One or more embodiments also include an enhancement to automatically protect the child processes of the protected application.

Runtime module 39 may also be configured to perform a method to determine whether a thread with escalated privilege made the API call or not. This method can include either querying the current process's user name through user mode API calls (GetUserNameEx, GetTokenInformation, LookupAccountSid etc) or by analyzing kernel mode access tokens.

Note that in certain example implementations, the protection module activities outlined herein may be implemented by logic encoded in one or more tangible media, which may include non transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processing element 50, or other similar machine, etc. In some of these instances, a memory element 52 can store data used for the operations described herein. This includes memory element 52 being able to store software, logic, code, or processor instructions that are executed to carry out the activities described in this Specification.

Processing element 50 can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by processing element 50) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof. Any of the potential processing elements, modules, and machines described in this Specification should be construed as being encompassed within the broad term 'processing element.'

The computer elements in computer system 10 may further keep information, to be used in achieving the metadata tag activities as discussed herein, in any suitable memory element (e.g., random access memory (RAM), read only memory (ROM), EPROM, EEPROM, ASIC, a disk drive, a floppy disk, a compact disk ROM (CD-ROM), a digital versatile disk (DVD), flash memory, a magneto-optical disk, other types of nonvolatile machine-readable media that are capable of storing data and information, etc.), software, hardware, firmware, or in any other suitable component, device, element, or object where appropriate and based on particular needs. Moreover, the information being used, tracked, sent, or received in computer system 10 could be provided in any database, register, queue, table, cache, or other storage structure, all of which can be provided in any suitable timeframe. Any of the memory items or storage options may be included within the broad term 'memory element' as used herein.

Figure 3:
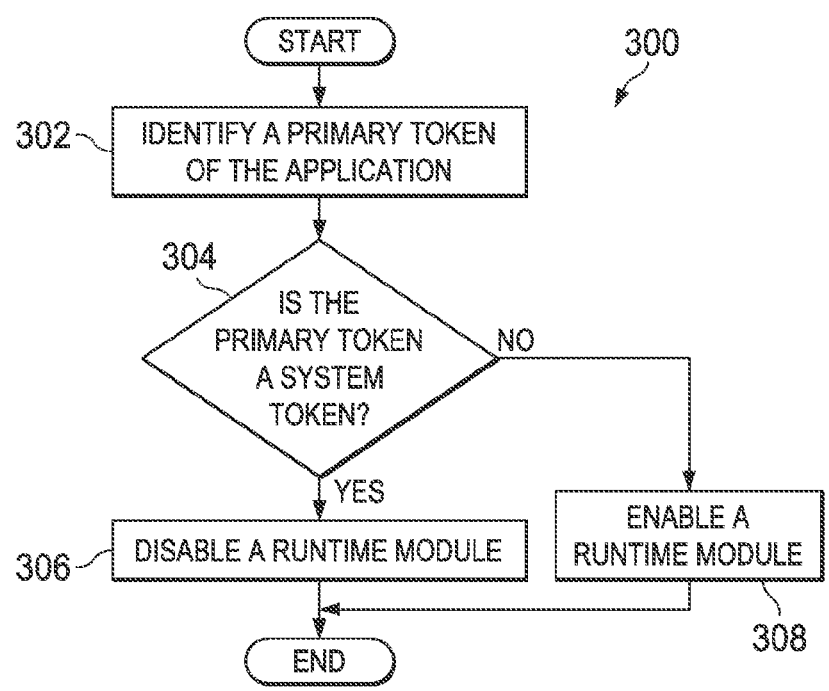
FIG. 3 is a simplified flowchart that illustrates an example flow that may be associated with computer system for initializing a protection module in a computer environment in accordance with an embodiment.

Turning to FIG. 3, a flowchart illustrates an example flow 300 that may be associated with computer system 10 for initializing a protection module in a computer environment. In an embodiment, flow 300 represents one or more activities performed by protection module 37 in computer system 10.

Flow 300 may begin at 302, when protection module 37 accesses an application. The application may be accessed at any point. In some embodiments, the application is accessed at startup. In other embodiments, the application is accessed during execution. In one or more embodiments, protection module 37 may also hook different API locations called by the application.

At 304, the protection module may identify an access token of the application. The access token may have different levels of access defined. For example, an access token may be a primary token with a system level or kernel mode privilege.

At 306, if the access token is a system token, then the protection module disables the runtime module for the application at 308. In this example, the application (or threads within the application) is considered to be privileged and therefore may not need protection from the protection module.

However, at 310, if the access token is not a system token, then the protection module enables the runtime module for the application, and flow 300 may end. If the access token is not a system token, then the application may be considered to be unprivileged. The application could have a lesser level of access privileges and could be a potential target for an escalation of privilege attack.

A protection module (i.e., generic privilege escalation prevention (GPEP) system), as disclosed herein, may provide a generic approach to prevent privilege escalation attacks. Because of the enforcement of user access control in newer operating systems, during a full-fledged attack, such as advanced persistent threat, the first stage exploitation may start at a lower privilege level and then try to elevate privilege to the system level before proceeding further with the attack. The privilege elevation allows the exploit to perform privileged system tasks.

Figure 4:
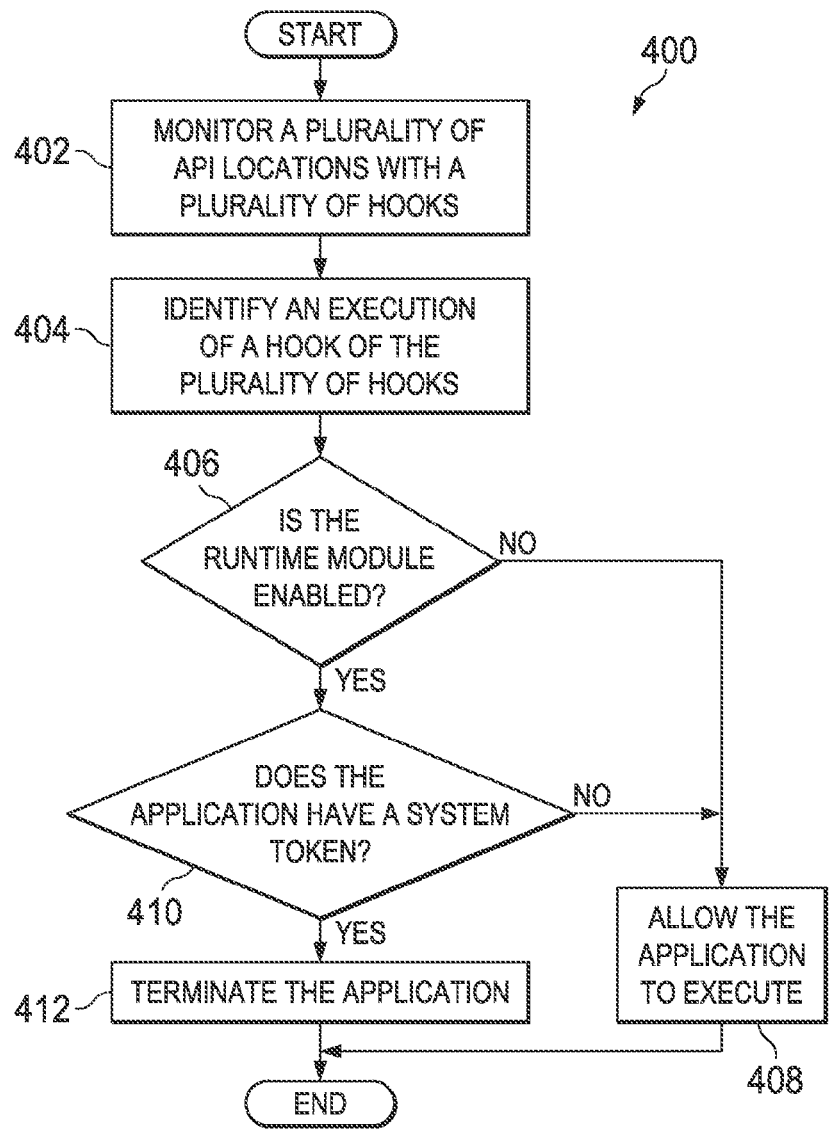
FIG. 4 is a simplified flowchart that illustrates an example flow that may be associated with computer system for running a protection module in a computer environment in accordance with an embodiment.

Different embodiments of this disclosure may be designed to block the exploit after succeeding in an elevation of privilege (EoP) and before performing subsequent attack behaviors. For example, one or more embodiments provide for enabling a runtime module for a target process if that target process does not have system level privileges (as shown in FIG. 3). If the target process then succeeds in EoP, the protection module may terminate the target process (as shown in FIG. 4). The protection module is able to determine EoP by identifying a system token in a target process that should not have a system token. Additionally, in an embodiment, the protection module is able to reduce processing overhead by monitoring certain API locations commonly used for malicious attacks.

Turning to FIG. 4, a flowchart illustrates an example flow 400 that may be associated with computer system 10 for running a protection module in a computer environment. In an embodiment, flow 400 represents one or more activities performed by protection module 37 in computer system 10.

Flow 400 may begin at 402, when the protection module monitors a plurality of API locations for a plurality of hooks. The protection module may be waiting for one of the plurality of hooks to be called by a thread of the application.

In an embodiment, whether the runtime module is enabled or disabled, the protection module still monitors the plurality of API locations of the application. Each API location may be a specific function within the API and accessed by an API call. For example, each API location may be, for example, but not limited to, Kernel32!CreateProcess, NtdII!NtQueryInformationToken, and other suitable API functions.

In different embodiments, the protection module may add a plurality of hooks into a plurality of API locations. The plurality of API locations may be determined based on frequency of use by exploits. The list of API locations may be defined by a user, a dynamic technique, a manufacturer, a list maintained on a server that may be updated periodically, or by some other method. In other embodiments, the plurality of hooks may be added to the plurality of API locations before runtime.

At 404, the protection module may identify an execution of a hook of the plurality of hooks. The protection module may receive notification that one of the API locations with a hook has been called.

At 406, the protection module determines whether the runtime module is enabled. If the protection module is not enabled, then, at 408, the protection module may allow the application to execute. Here, the application may have been determined to be privileged in flow 300 and thus may not need further management.

If the runtime module is enabled, at 410, the runtime module determines whether the application has a system token. Here, if runtime module was enabled in flow 300, then the application may not have been considered privileged. If the application was not privileged then there should not be a system token at any time. A system token is an indication at this stage in the flow that an escalation of privilege occurred.

If there is no system token, then, at 408, the protection module may allow the application to execute. Here, there is no system token so there may not be an escalation of privilege.

If there is a system token, then, at 412, the protection module may terminate the application, and flow 400 may end. If there is a system token and the protection module is enabled, then there may have been an escalation of privilege and the application may need to be terminated to stop an attack.

One or more embodiments of this disclosure recognize that currently, an endpoint security mechanism may not be able to prevent some EoP attacks, especially those that occur by exploiting kernel mode memory corruption vulnerabilities. Different embodiments of this disclosure can be implemented as an extension to a memory protection solution to fill the gap. If an exploit succeeds in EoP, it can subsequently be detected by a protection module (as shown in FIG. 4) by identifying a system level token in a target process that previously did not have system level access. Consequently, the protection module may terminate the target process.

In an embodiment, when EoP is detected, protection module 39 may terminate the calling thread. Additionally, protection module 39 may include an exclusion mechanism to reduce false positives and performance degradation. The API name, application name, or a combination thereof can be specified in the configuration file to be excluded from protection. By using the object name and application name, protection module 37 may be able to put the object or application on a protected application list. Protection module 37 may then protect only those items that are on the list.

Figure 5:
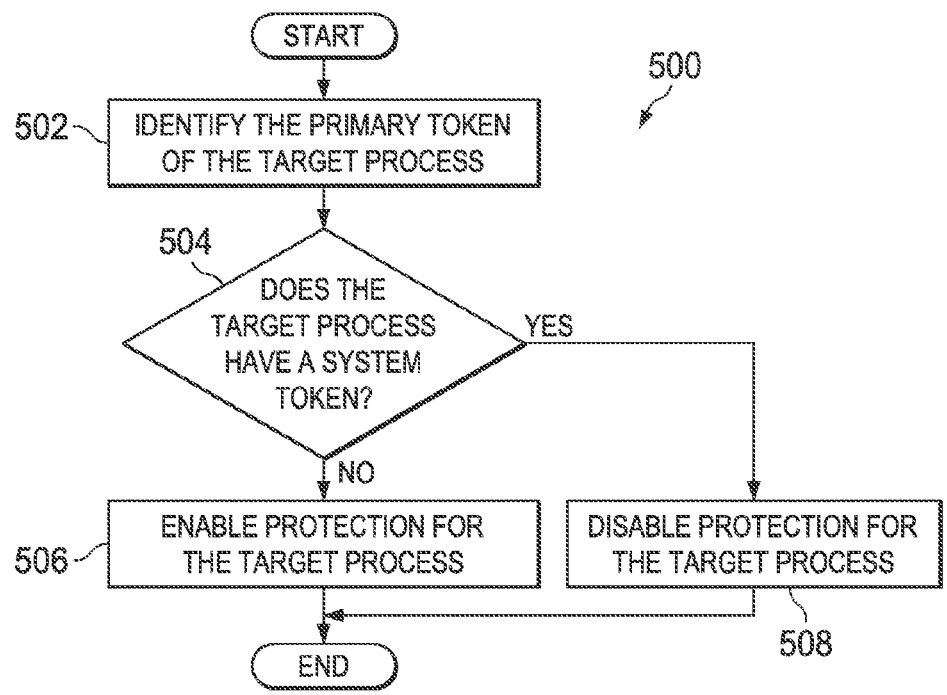
FIG. 5 is a simplified flowchart that illustrates an example flow that may be associated with computer system for managing a process in a computer environment in accordance with an embodiment.

Turning to FIG. 5, a flowchart illustrates an example flow 500 that may be associated with computer system 10 for managing a process in a computer environment. In an embodiment, flow 500 represents one or more activities performed by protection module 37 in computer system 10.

Flow 500 may begin at 502, the protection module may identify the access token of a target process. In an embodiment, the target process may be an API. Finding the access token may be done at injection time. The access token may indicate whether the application is privileged or not. This may be performed in response to an API location with a hook being called by the application or a thread of the application.

In one or more embodiments, before 502, the protection module may be injected into the target process and hook a set of API locations before runtime. In other embodiments, the protection module may be injected in the target process based on a list of APIs that are to be monitored an protected. Additionally, the hooks may also be placed before runtime or dynamically by the protection module based on a list of common locations of the API for malicious attacks.

At 504, the protection module determines whether the target process has a system token. The determination may be performed by an analysis of the privileges of the access token. If the access token has system level access or better then the access token may be considered a system token. If the target process does not have a system token, then, at 506, the protection module may enable protection for the target process. If the target process has a system token, then, at 508, protection is disabled for the target process. A runtime module of the protection module may perform the protection.

The protection module can be implemented via an API intercepting mechanism. Critical API calls in the specified application may be monitored. The included applications may be high-risk, remotely exploitable, normal applications (non-system/service process). When the protected application is being exploited (e.g. EoP after buffer-overflowed), and a monitored API is called, the protection module may check if the current thread is running with a privilege level it shouldn't have; if so, the protection module may terminate the thread.

Figure 6:
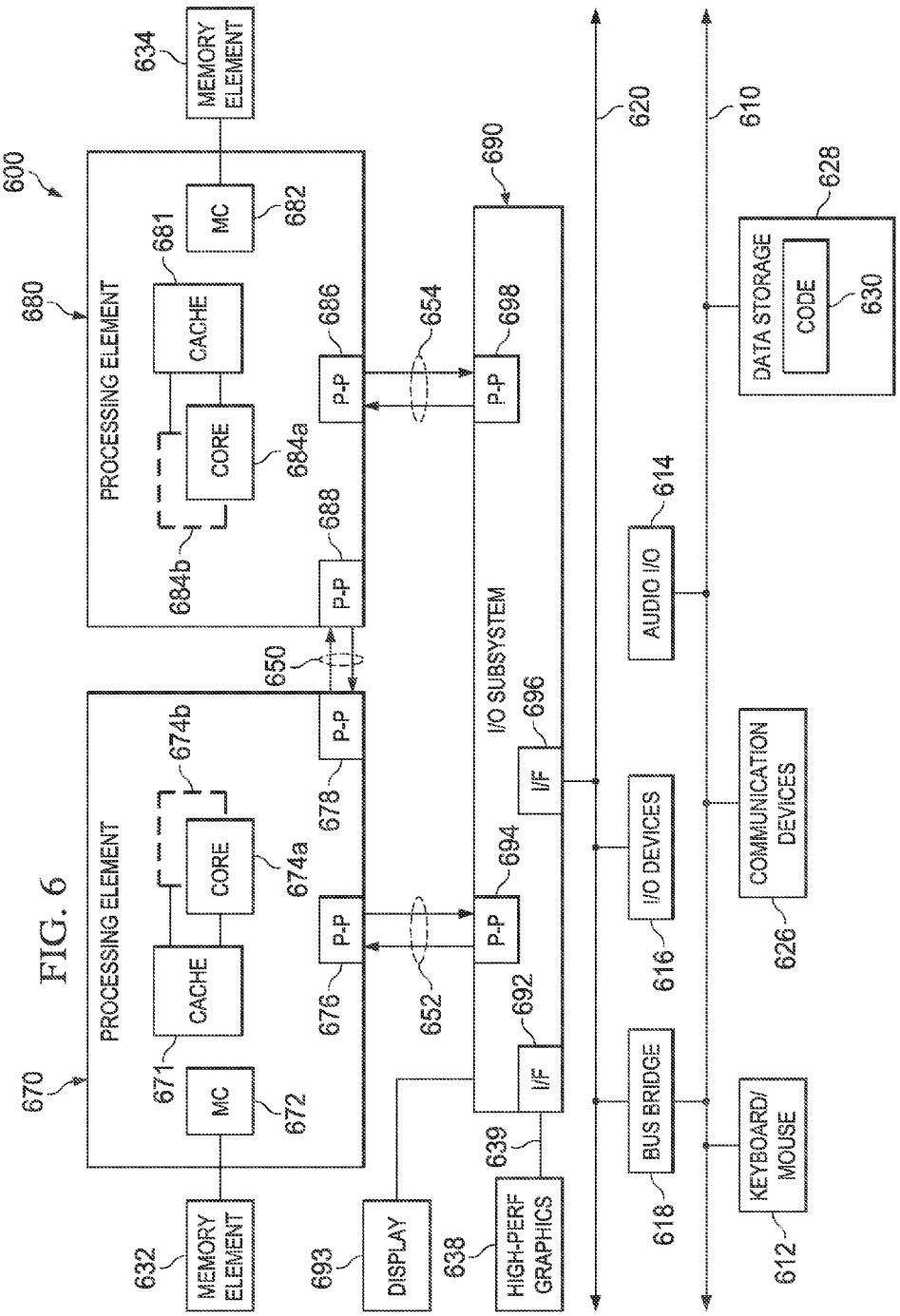
FIG. 6 is a simplified block diagram illustrating a computing system that is arranged in a point-to-point configuration according to an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, computer elements of computer system 10 may be configured in the same or similar manner as computing system 600.

As illustrated in FIG. 6, system 600 may include several processing elements, of which only two processing elements 670 and 680 are shown for clarity. While only two processing elements 670 and 680 are shown, it is to be understood that an embodiment of system 600 may also include only one such processing element. Processing elements 670 and 680 may each include a processor core 674a and 684a to execute multiple threads of a program. Processors 670 and 680 may also each include integrated memory controller logic (MC) 672 and 682 to communicate with memory elements 632 and 634. The memory elements 632 and/or 634 may store various data. In alternative embodiments, memory controller logic 672 and 682 may be discrete logic separate from processing elements 670 and 680.

Processing elements 670 and 680 may be any type of a processing element (also referred to herein as 'processor'). Processing elements 670 and 680 may exchange data via a point-to-point (PtP) interface 650 using point-to-point interface circuits 678 and 688, respectively. Processing elements 670 and 680 may each exchange data with a I/O subsystem 690 via individual point-to-point interfaces 622 and 624 using point-to-point interface circuits 676, 686, 694, and 698. As shown herein, I/O subsystem is separated from processing elements 670 and 680. However, in an embodiment, I/O subsystem is integrated on the same chip as processing elements 670 and 680. Also, I/O subsystem may be partitioned differently with fewer or more integrated circuits. Additionally, I/O subsystem 690 may also exchange data with a high-performance graphics circuit 638 via a high-performance graphics interface 639, using an interface circuit 692, which could be a PtP interface circuit. In an embodiment, I/O subsystem 690 may connect to a display 693 through an interface circuit. Display 693 may include, but is not limited to, a liquid crystal display (LCD), a plasma, cathode ray tube (CRT) display, a touch screen, or any other form of visual display device. In alternative embodiments, any or all of the PtP links illustrated in FIG. 6 could be implemented as a multi-drop bus rather than a PtP link.

As shown in FIG. 6, each of processing elements 670 and 680 may be multicore processors, including first and second processor cores (i.e., processor cores 674a and 674b and processor cores 684a and 684b). Such cores may be configured to execute instruction code in a manner similar to that discussed above with reference to FIGS. 2-5. Each processing element 670, 680 may include at least one shared cache 696. Shared cache 671, 681 may store data (e.g., instructions) that are utilized by one or more components of processing elements 670, 680, such as cores 674a, 674b, 684a, and 684b. Processing elements 670 and 680 may be examples of processing element 50 as shown in FIG. 2. Additionally, memory elements 632 and 634 may be examples of memory element 52 as shown in FIG. 2.

I/O subsystem 690 may be in communication with a bus 620 via an interface circuit 696. Bus 616 may have one or more devices that communicate over it, such as a bus bridge 618 and I/O devices 616. Via a bus 610, bus bridge 618 may be in communication with other devices such as a keyboard/mouse 612 (or other input device such as a touch screen, trackball, etc.), communication devices 626 (such as modems, network interface devices, or other types of communication devices that may communicate through a computer network), audio I/O devices 614, and/or a data storage device 628. Data storage device 628 may store code 630 that may be executed by processing elements 670 and/or 680. In alternative embodiments, any portions of the bus architectures could be implemented with one or more PtP links.

The computing systems depicted herein are schematic illustrations of embodiments of computing systems, such as a host computer, that may be utilized to implement various embodiments discussed herein. It will be appreciated that various components of the systems depicted herein may be combined in a system-on-a-chip (SoC) architecture or in any other suitable configuration. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments.

In one example, computer elements of computer system 10 may include software in order to achieve the protection activities outlined herein. These activities can be facilitated by various modules (e.g., a protection module, etc.), which can be suitably combined in any appropriate manner, and which may be based on particular configuration and/or provisioning needs. In other embodiments, these protection activities may be executed externally to these elements, or included in some other computer element to achieve this intended functionality. In still other embodiments, the elements in computer system 10 may include this software (or reciprocating software) that can coordinate with other computer elements in order to achieve the operations, as outlined herein. Furthermore, the modules can be implemented as software, hardware, firmware, or any suitable combination thereof.

Note that with the examples provided herein, interaction may be described in terms of two, three, or more computer elements. However, this has been done for purposes of clarity and example only. In certain cases, it may be easier to describe one or more of the functionalities of a given set of flows by only referencing a limited number of computer elements. It should be appreciated that computer system 10 and its teachings are readily scalable and can accommodate a large number of components, as well as more complicated/sophisticated arrangements and configurations. Accordingly, the examples provided should not limit the scope or inhibit the broad teachings of computer system 10 as potentially applied to a myriad of other architectures.

It is also important to note that the operations in the preceding flow diagrams illustrate only some of the possible protection scenarios and patterns that may be executed by, or within, computer system 10. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by computer system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations.

Examples

Example 1 is an apparatus for managing an application, comprising a protection module, wherein the protection module is configured to identify an access token of the application; determine if the access token is a system token; and responsive to the access token failing to be a system token, enable a runtime module.

Additionally, the subject matter of Example 1 can optionally include, the apparatus further comprising: a processing element, wherein the processing element is coupled to the protection module; and a memory element, wherein the memory element is coupled to the processing element.

In example 2, the subject matter of Example 1 can optionally include, the protection module is further configured to determine whether the application is a protected application and responsive to the application being a protected application, access the application.

In example 3, the subject matter of any one of Examples 1-2 can optionally include, the protection module is further configured to, responsive to the access token being a system token, disable a runtime module.

In example 4, the subject matter of any one of Examples 1-3 can optionally include, the protection module is further configured to monitor a plurality of API locations with a plurality of hooks; identify an execution of a hook of the plurality of hooks; and responsive to the execution of the hook, determine whether the runtime module is enabled.

In example 5, the subject matter of any one of Examples 1-4 can optionally include, the protection module is further configured to, responsive to the runtime module being enabled, protect the application.

In example 6, the subject matter of any one of Examples 1-5 can optionally include, the apparatus further comprises the runtime module coupled to the processing element, wherein the runtime module is configured to determine whether the application has the system token; and responsive to the application having the system token, terminate the application.

In example 7, the subject matter of any one of Examples 1-6 can optionally include, the protection module is further configured to, responsive to the runtime module being disabled, allow the application to execute.

In example 8, the subject matter of any one of Examples 1-7 can optionally include, the runtime module is further configured to, responsive to the application failing to have the system token, allow the application to execute.

Example 9 is at least one computer readable storage medium that includes code for execution for managing an application, and when executed by a processing element is operable to: identify an access token of the application; determine if the access token is a system token; and responsive to the access token failing to be a system token, enable a runtime module.

In example 10, the subject matter of Example 9 can optionally include, the logic further including code for execution and when executed by the processing element is operable to: determine whether the application is a protected application; and responsive to the application being a protected application, access the application.

In example 11, the subject matter of any one of Examples 9-10 can optionally include, the logic further including code for execution and when executed by the processing element is operable to: responsive to the access token being a system token, disable a runtime module.

In example 12, the subject matter of any one of Examples 9-11 can optionally include, the logic further including code for execution and when executed by the processing element is operable to: monitor a plurality of API locations with a plurality of hooks; identify an execution of a hook of the plurality of hooks; and responsive to the execution of the hook, determine whether the runtime module is enabled.

In example 13, the subject matter of any one of Examples 9-12 can optionally include, the logic further including code for execution and when executed by the processing element is operable to: responsive to the runtime module being enabled, protect the application.

In example 14, the subject matter of any one of Examples 9-13 can optionally include, the logic further including code for execution and when executed by the processing element is operable to: determine whether the application has the system token; and responsive to the application having the system token, terminate the application.

In example 15, the subject matter of any one of Examples 9-14 can optionally include, the logic further including code for execution and when executed by the processing element is operable to: responsive to the runtime module being disabled, allow the application to execute.

In example 16, the subject matter of any one of Examples 9-15 can optionally include, the logic further including code for execution and when executed by the processing element is operable to: responsive to the application failing to have the system token, allow the application to execute.

Example 17 is a method for managing an application, comprising: identifying an access token of the application; determining if the access token is a system token; and responsive to the access token failing to be a system token, enabling a runtime module.

In example 18, the subject matter of Example 17 can optionally include, determining whether the application is a protected application; and responsive to the application being a protected application, accessing the application.

In example 19, the subject matter of any one of Examples 17-18 can optionally include, responsive to the access token being a system token, disabling a runtime module.

In example 20, the subject matter of any one of Examples 17-19 can optionally include, monitoring a plurality of API locations with a plurality of hooks; identifying an execution of a hook of the plurality of hooks; and responsive to the execution of the hook, determining whether the runtime module is enabled.

In example 21, the subject matter of any one of Examples 17-20 can optionally include, responsive to the runtime module being enabled, protecting the application.

In example 22, the subject matter of any one of Examples 17-21 can optionally include, the protecting the application comprises: determining whether the application has the system token; and responsive to the application having the system token, terminating the application.

In example 23, the subject matter of any one of Examples 17-22 can optionally include, responsive to the runtime module being disabled, allowing the application to execute.

In example 24, the subject matter of any one of Examples 17-23 can optionally include, responsive to the application failing to have the system token, allowing the application to execute.

Example 25 is an apparatus for managing an application, comprising means for performing the method of any of examples 17-24.

In example 26, the subject matter of Example 25 can optionally include, the means for performing the method comprise a processor and a memory.

In example 27, the subject matter of Example 26 can optionally include, the memory comprises machine-readable instructions, that when executed cause the apparatus to perform the method of any of examples 17-24.

Example 28 is an apparatus for managing an application, comprising means for: identifying an access token of the application; determining if the access token is a system token; and responsive to the access token failing to be a system token, enabling a runtime module.

In example 29, the subject matter of Example 28 can optionally include, means for: determining whether the application is a protected application; and responsive to the application being a protected application, accessing the application.

In example 30, the subject matter of any one of Examples 28-29 can optionally include, means for: responsive to the access token being a system token, disabling a runtime module.

In example 31, the subject matter of any one of Examples 28-30 can optionally include, means for: monitoring a plurality of API locations with a plurality of hooks; identifying an execution of a hook of the plurality of hooks; and responsive to the execution of the hook, determining whether the runtime module is enabled.

In example 32, the subject matter of any one of Examples 28-31 can optionally include, means for: responsive to the runtime module being enabled, protecting the application.

In example 33, the subject matter of any one of Examples 28-32 can optionally include, means for: determining whether the application has the system token; and responsive to the application having the system token, terminating the application.

In example 34, the subject matter of any one of Examples 28-33 can optionally include, means for: responsive to the runtime module being disabled, allowing the application to execute.

In example 35, the subject matter of any one of Examples 28-34 can optionally include, means for: responsive to the application failing to have the system token, allowing the application to execute.

In example 36, the subject matter of any one of Examples 1-8, 25-26, and 28-35 can optionally include, the apparatus is a computing system.

Example 37 is at least one computer readable medium comprising instructions for managing an application that, when executed, realize an apparatus as described in Examples 1-8, 25-26, and 28-35 or implement a method as described in examples 17-25.

What is claimed is:

1. At least one non-transitory computer readable storage medium that includes code for execution, that when executed, causes at least one processor to:
   identify an execution of a hook of an application programming interface (API), wherein the execution of the hook is caused, at least in part, by an application;
   responsive to the execution of the hook, determine whether a runtime module is enabled, wherein the runtime module determines whether a thread of the application made an API call;
   responsive to determining that the runtime module is enabled, determine whether the application has a system token; and
   terminate at least the thread of the application based on determining that the runtime module is enabled and the application has the system token.

2. The at least one non-transitory computer readable storage medium of claim 1, wherein the application programming interface (API) is to perform one of examining a user privilege of a current process, loading a dynamic link library (DLL), creating a new process, or injecting to other processes.

3. The at least one non-transitory computer readable storage medium of claim 1, wherein when executed, the code causes the at least one processor to:
   access the application to identify an access token;
   determine, prior to the execution of the hook, whether the access token is a system token; and
   responsive to a determination that the access token is not a system token, enable the runtime module.

4. The at least one non-transitory computer readable storage medium of claim 3, wherein the application is accessed during an execution of the application or during a startup of a computing device that includes the at least one processor.

5. The at least one non-transitory computer readable storage medium of claim 1, wherein the application is a web browser.

6. The at least one non-transitory computer readable storage medium of claim 1, wherein the hook is one of a plurality of hooks in a plurality of application programming interface (API) locations of corresponding APIs, wherein the plurality of API locations are selected based on a frequency of use of the corresponding APIs by exploits.

7. The at least one non-transitory computer readable storage medium of claim 6, wherein the plurality of hooks are added to the plurality of API locations before runtime.

8. The at least one non-transitory computer readable storage medium of claim 1, wherein the thread is identified for termination based on being the thread that called the API.

9. An apparatus, comprising:
a memory element coupled to a processor; and
a protection module including a set of executable instructions stored in the memory element, wherein the executable instructions, when executed by the processor, are to
identify an execution of a hook of an application programming interface (API), wherein the execution of the hook is caused, at least in part, by an application;
responsive to the execution of the hook, determine whether a runtime module is enabled, wherein the runtime module determines whether a thread of the application made an API call;
responsive to determining that the runtime module is enabled, determine whether the application has a system token; and
terminate at least the thread of the application based on determining that the runtime module is enabled and the application has the system token.

10. The apparatus of claim 9, wherein the application programming interface (API) is to perform one of examining a user privilege of a current process, loading a dynamic link library (DLL), creating a new process, or injecting to other processes.

11. The apparatus of claim 9, wherein the executable instructions, when executed by the processor, are to:
access the application to identify an access token;
determine, prior to the execution of the hook, whether the access token is a system token; and
responsive to a determination that the access token is not a system token, enable the runtime module.

12. The apparatus of claim 11, wherein the application is accessed during an execution of the application or during a startup of the apparatus.

13. The apparatus of claim 9, wherein the hook is one of a plurality of hooks in a plurality of application programming interface (API) locations of corresponding APIs, wherein the plurality of API locations are selected based on a frequency of use of the corresponding APIs by exploits.

14. The apparatus of claim 13, wherein the plurality of hooks are added to the plurality of API locations before runtime.

15. The apparatus of claim 9, wherein the thread is identified for termination based on being the thread that called the API.

16. A method, comprising:
identifying an execution of a hook of an application programming interface (API), wherein the execution of the hook is caused, at least in part, by an application;
responsive to the execution of the hook, determining whether a runtime module is enabled, wherein the runtime module determines whether a thread of the application made an API call;
responsive to determining that the runtime module is enabled, determining whether the application has a system token; and
allowing the application to execute based on determining that the runtime module is enabled and the application does not have the system token.

17. The method of claim 16, further comprising:
accessing the application to identify an access token;
determining, prior to the execution of the hook, whether the access token is a system token; and
responsive to a determination that the access token is not a system token, enabling the runtime module.

18. The method of claim 16, wherein the application is a web browser.

19. At least one non-transitory computer readable storage medium that includes code for execution, that when executed, causes at least one processor to:
identify an access token of an application;
determine, prior to an execution of a hook of an application programming interface (API), whether the access token is a system token;
responsive to a determination that the access token is the system token, disable a runtime module, wherein the runtime module determines whether a thread of the application made an API call;
identify the execution of the hook of the API, wherein the execution of the hook is caused, at least in part, by the application;
responsive to the execution of the hook, determine whether the runtime module is enabled; and
allow the application to execute based on determining that the runtime module is disabled.

20. The at least one non-transitory computer readable storage medium of claim 19, wherein the execution of the hook is identified based, at least in part, on receiving a notification that the API was called by the thread of the application.

* * * * *